United States Patent [19]

Kurata

[11] Patent Number: 4,594,089
[45] Date of Patent: Jun. 10, 1986

[54] METHOD OF MANUFACTURING GLASS

[75] Inventor: Motoharu Kurata, Tokyo, Japan

[73] Assignee: Asahi Glass Co. Ltd., Tokyo, Japan

[21] Appl. No.: 675,894

[22] Filed: Nov. 28, 1984

[30] Foreign Application Priority Data

Jan. 28, 1984 [GB] United Kingdom ................. 8402298

[51] Int. Cl.⁴ ............................................. C03B 5/22
[52] U.S. Cl. ......................................... 65/135; 65/136;
65/337; 65/339; 65/342; 65/347
[58] Field of Search ................. 65/135, 136, 346, 347,
65/337, 339, 342

[56] References Cited

U.S. PATENT DOCUMENTS 3,499,743  3/1970  Fanica et al. ..................... 65/347 X

FOREIGN PATENT DOCUMENTS 0086858  8/1983  European Pat. Off. ............. 65/347
806883  4/1951  Fed. Rep. of Germany .
225837  9/1925  United Kingdom .
250536  7/1926  United Kingdom .
597838  2/1948  United Kingdom .
597842  2/1948  United Kingdom .
599957  3/1948  United Kingdom .
611401  10/1948  United Kingdom .

Primary Examiner—Robert Lindsay
Attorney, Agent, or Firm—Spencer & Frank

[57] ABSTRACT

A method for manufacturing glass by melting a batch of raw material in a melting chamber of a continuous glass-melting tank furnace, permitting the glass to flow through a rising passageway and a sill provided by the furnace to a separate refining chamber in the furnace, the atmospheres in the melting and refining chambers being isolated, and heating the glass at the upstream end of the refining chamber to a higher temperature than that of the glass over the sill so that the glass leaving the sill plunges into the refining chamber and is precluded from forming a return current to the melting chamber.

25 Claims, 4 Drawing Figures

METHOD OF MANUFACTURING GLASS

BACKGROUND OF THE INVENTION

This invention relates to a method of manufacturing glass in which raw material is fed as a batch to a continuous glass-melting tank furnace, the batch being melted in a melting zone and passing to a refining zone for the delivery of molten, refined glass.

At the present time, the manufacture of glass on an industrial scale takes place almost exclusively in continuous tank furnaces. The only exceptions to this rule are in the production of glasses of a highly specialised nature, whether by virtue of their composition or their working.

The concept of tank furnaces derives from work done by Friedrich Siemens over a hundred years ago: these furnaces comprise a tank containing molten glass, the tank being surmounted by a superstructure of side walls and a crown which contains the atmosphere above the melt. The heat necessary for melting the raw batch materials to form the glass, an for refining it, is generated by burning gas or fuel oil in that atmosphere. The combustion supporting air is itself preheated by regenerators which recover part of the heat of exhaust gases issuing from the furnace.

In the manufacture of glass, costs are incurred under various heads, in particular capital and maintenance costs of the plant used, raw material costs, labour costs and the fuel consumed in melting and vitrifying the raw materials. Of these, fuel consumption is not the least significant.

The specific fuel consumption will depend on various factors. Economies of scale are possible, so that glass can be produced at lower cost in a larger capacity furnace. In a furnace of given capacity, production will be more economic if the furnace is running at full capacity than if it is producing glass at only a fraction of that rate. The temperature required to form the glass depends on the composition of the batch used to produce that glass, since some raw materials are more difficult to melt than others, and this also affects fuel consumption. The type of glass product to be made from the molten glass can also have an indirect effect on fuel consumption; comparing figured rolled glass or bottle glass with float glass of the same composition, it will be clear that a higher population of optical defects, for example bubbles due to incomplete refining of the glass, can be tolerated in figured or bottle glass than in float glass which should be substantially defect free. In general, glass of higher optical quality requires higher fuel consumption. Finally, mention must be made of fuel consumed in order to maintain the temperature of the furnace in view of heat loss through its walls.

In continuous glass-melting tank furnaces, the vitrifiable batch is fed continuously onto the molten glass at the charging end of the furnace, and it is then melted and refined at very high temperature; the molten glass is then progressively cooled to a temperature appropriate for working. In industrial tank furnaces, melting and refining take place in one compartment of the furnace, whereas temperature adjustment of the refined glass is effected in a second compartment more or less isolated from the first, it being of course understood that there is sufficient continuity for the glass to flow from one end of the furnace to the other.

It was not until several decades after the invention of the continuous tank furnace, until flat glass was being produced widely and on a large scale in the early part of the present century, that glassmakers began to take account of the fact that the bath of molten glass is in continuous movement as a result of quite strong convection currents due to differences in density between glass at different temperatures in different parts of the furnace tank. The currents include relatively cool, so-called return currents flowing along the sole of the tank, and hotter currents flowing at the surface. The return currents flow from cooler regions of the furnace towards its hottest point (the "hot spot"), while the surface currents flow away from the hot spot. The convection currents give rise to an appreciable increase in the consumption of heat energy in the furnace because there is a continuous recirculating flow of glass which is cyclically cooled at the side walls of the furnace and reheated at the hot spot: the glass acts to carry a continuous flux of heat energy which is lost through the side walls of the furnace.

Some of those skilled in the art believe that these convection currents have a favourable effect on the melting and refining of the glass inter alia by promoting homogenization of the melt: others object that these currents can have a disadvantageous effect because they ensure the dispersion of accidental defects in the melt, and because they can dehomogenize the glass if their flow pattern is unsuitable. It is agreed, however, that return currents which circulate from one zone of the furnace tank to another will inevitably be present. Indeed it is also agreed that for the maintenance of high quality in the production of some types of glass, for example flat glass, the presence of return currents flowing from one zone of the furnace to another is essential.

As a result, in an attempt to control these currents, glassmakers have adopted certain measures intended to modify the strength and distribution of these convection currents. Among other things, it has been proposed to place obstacles such as bridges or floaters and sills in the path of these currents to guide their circulation. It has also been proposed to modify the plan or horizontal cross section of the furnace in order to provide necks to brake and concentrate these currents.

An early example of such a proposal is set out in British Patent Specification No 250,536 (Société Anonyme des Manufactures des Glaces et Produits Chimiques de St Gobain, Chauny et Cirey). That specification proposes dividing the tank furnace into separate melting and refining compartments in such a way that glass leaves the melting tank at its base and flows upwards through a passageway into the refining compartment. The glass flows over a sill in the upstream end of the refining compartment and then into a into a deeper downstream portion of the refining compartment. The molten glass is then led off from the base of the refining compartment and passed to what is called a pouring zone. The object of that invention is to promote rapid refining of the glass, and to that end burner ports are provided above the sill in order to heat the glass flowing over the sill where it is shallowest so that refining in fact takes place above the sill where bubbles can escape most easily. It is an essential feature of the process there described that the glass should be at its hottest over the sill and should cool as it enters the deeper downstream portion of the refining compartment so that it can be drawn off from the base of that compartment. If the glass flowing in a thin layer over the sill is heated very strongly, as it must be according to that proposal, it necessarily follows that the refractory material of which the sill is made will also be heated very strongly with a consequent high risk of severe sill erosion. It accordingly becomes necessary to cool the sill. As a result, heat energy is removed from the furnace so that fuel is wasted. In addition, with the constructions of tank furnace illustrated in that specification there will be a large energy loss due to contact of the molten glass with a large area of furnace wall which is exposed to the atmosphere as the molten glass flows from the melting compartment to the refining compartment. A further disadvantage of this proposal is that because the glass is refined where it is very shallow and is then allowed to cool as it flows down into a deeper portion of the refining compartment, there will be no substantial circulating currents set up in the refining compartment with the result that homogenization of the glass will be poor.

Other proposals have been made along similar lines, but none has been found commercially acceptable because of the high specific fuel consumption required to produce glass of a satisfactory quality, and further research and experimentation has led to the proposal of a furnace which is of a very different design.

The possibility has been studied of effecting melting in a vertical column down which the vitrifiable batch falls against rising exhaust fumes and flames generated at the base of the column; the glass melted in this way is then refined in a tank specially constructed for that purpose. In fact such a system can suffer from unacceptable refractory erosion at the base of the melting column, and so this also has not been adopted commercially. Although certain proposals would in theory allow production of glass with a low specific fuel consumption, they are surrounded by practical difficulties which stand in the way of their commercial adoption.

The low fuel efficiency of tank furnaces has been known for a long time, but it has become of particular importance since the oil crisis of the early nineteen-seventies. Efforts have, however, been concentrated on apparatus peripheral to the tank rather than on the tank itself. Attempts have been made to generate a gas-fed flame which is more radiant, to improve heat recovery for example by using regenerator flue gases to preheat the vitrifiable batch, and to increase furnace insulation. But even if these steps do give an increased specific yield of glass in relation to heat energy consumed, they do not have any intrinsic effect on the nature of the glass forming process: they have no effect on the basic cause of heat loss from the melt due in part to the recirculating return currents: they treat the symptoms, not the disease.

SUMMARY OF THE INVENTION

The present invention constitutes a radical change in the direction of the path of research for a more efficient furnace. The inventor is concerned to suppress a fundamental cause of heat loss while maintaining the quality of the glass produced in a simple and practical manner so that the invention can easily be put into commercial practice.

It is an object of the present invention to provide a method of manufacturing glass of a given composition and quality at a given maximum production rate with a lower specific fuel consumption.

According to the present invention, there is provided a method of manufacturing glass in which raw material is fed as a batch to a continuous glass-melting tank furnace, the batch being melted in a melting zone and passing to a refining zone for the delivery of molten refined glass, characterised in that the melting and refining are effected in separate chambers the atmospheres in which are isolated from each other; the molten glass flows from the melting chamber to the refining chamber via a rising passageway and over a sill at the upstream end of the refining chamber; and the glass at the upstream end of the refining chamber is heated to a higher temperature than that of the glass over the sill so that glass leaving the sill plunges in the refining chamber and glass in that chamber is precluded from forming a return current to the melting chamber.

As has already been intimated, in conventional methods of manufacturing glass as currently commercially practised, use is made of a tank furnace having a combined melting and refining chamber which is heated so that the melt is at its maximum temperature at about the centre of that chamber. In the zone of that hot spot, usually termed the spring zone, there is an upwelling of the melt which results in spreading surface currents some of which are forward currents flowing towards the working end of the furnace and some of which are backward currents flowing towards the charging end. Those backward surface currents act to confine floating as yet unmelted (or only partially melted) batch material, and foam resulting from melting and glass-forming reactions, behind a foam line which is generally regarded as setting the limit between the melting zone and the refining zone of that furnace. The surface currents are fed by bottom currents in the tank which respectively return from the charging end and from the working end.

This arrangement presents certain disadvantages. Hot surface currents of the melt flow from the spring zone to the charging end where the melt cools by heat transfer to the walls of the furnace. Those surface currents, which are in part fed by bottom return currents of refined glass, pass in contact with the batch and entrain batch material which is not homogeneous, and such material can be transferred to forward surface current in the refining zone. The previously refined glass requires further refining. It is necessary to run the furnace at a relatively high temperature in order to ensure a given low defect population in the final product. Also, since the melting zone extends substantially to the hot spot, at least the downstream end of the melting zone is at an unnecessarily high temperature. All these factors contribute to inefficient use of fuel used for heating the furnace.

In distinction to this, because there will be substantially no return current from the refining zone to the melting zone, and because the atmospheres of those two zones are isolated from each other, for the same composition and quality of glass being produced, a method according to the invention can be performed while at least the melting zone is maintained at a lower maximum temperature than would be possible in a conventional furnace, so that heat loss through the walls of the furnace is reduced: furthermore, heat loss due to hot refined glass flowing past the charging end wall of the furnace is substantially eliminated, and the maximum temperatures of the glass in the refining and melting zones can be regulated more easily, and they can be regulated independently of one another. A further and very important advantage follows from this, relating to thermal insulation of the furnace. It is obviously desirable to insulate any furnace to reduce heat loss through its walls, and it might be thought the more insulation the better. But this is not the case. If the walls of the furnace are insulated, they will clearly be hotter than if they are not, and it is unfortunate that the hotter is the refractory material of which the walls are made, the faster that material will be eroded by the melt. Accordingly, the amount of insulation to be used on any given furnace will represent a compromise between limiting heat loss through the furnace walls and prolonging the useful life of the furnace between repairs. Because a furnace operated in accordance with the present invention can be run at a lower temperature than a conventional tank furnace, a more effective insulation of the furnace walls can be tolerated without shortening the length of time between furnace repairs.

Accordingly, by adopting this invention, a greater efficiency in the use of fuel is achieved than is possible with such glass-melting tank furnaces as are currently used commercially.

The present invention also makes a marked departure from the teaching of earlier proposals to use a two compartment furnace as exemplified by British Patent Specification No. 250,536, in which the sill forms part of the refining compartment and the maximum temperature in the refining compartment is over the sill. When operating according to the present invention, the glass flowing over the sill is cooler so that refining is suppressed there and glass spilling over the sill into a zone where refining does take place sets up a circulating current in that zone which not only assists refining but also promotes homogenization of the melt.

Also, because the melt entering the refining tank forms a sinking current, there is substantially no risk that it can flow directly to an exit from that tank which is located in the upper third of the depth of that tank as is preferred, without having remained in the refining tank for long enough for refining to have taken place.

It is especially preferred that the melt enters the refining tank from a region where the surface of the melt is, due to the prevailing temperature and flow rate, substantially covered by foam. This reduces any risk of too rapid heating of the melt entering the refining tank, so enhancing the tendency of that melt to form a sinking current, and any such foam which extends across the glass over the sill will have a further effect in shading the refractory material of which the sill is made so that sill erosion is reduced.

In the most preferred embodiments of the invention, the maximum temperature of the glass in the refining tank is kept higher than the maximum temperature of the glass in the melting tank. This promotes fuel economy insofar as the melting tank is not heated to the high temperatures required for refining the glass.

Advantageously, the maximum temperature of the glass in the refining tank is maintained at a value which is at least 100° C. greater than the maximum temperature of the glass in the melting tank. This promotes rapid refining of the glass. In fact, the speed of refining is increased by increasing the temperature in the refining tank, so for the most rapid refining, the tank could be run at a temperature as hot as could be withstood by the refractory material of which it is formed. However in order to limit heat losses from the refining tank, such temperature differential is preferably not more than 300° C. It has been found that, when using any given furnace and for any given quality and composition of glass, the maintainance of such a temperature differential gives the greatest benefit in fuel economy.

The invention is applicable to the manufacture of many different types of glass. It will be appreciated that the optimum temperatures to be maintained in the melting and refining tanks will depend on the type of glass being produced. For example borosilicate glasses will in general require higher temperatures than soda-lime glasses to achieve a given quality. However general statements for all types of glass can be made by referring to the temperature at which the logarithm (to base 10) of the viscosity of the glass in Poises (10P equal 1 pascal second) has a particular value, say N: this is denoted by the expression "the N temperature". In this specification, though not in the claims hereof, references to the N temperature will be followed by references in parenthesis to actual temperature values which are the corresponding temperatures for soda-lime glass. It is preferred that the maximum temperature in the refining tank is maintained between the 2.18 temperature (1425° C.) and the 1.95 temperature (1500° C.). Alternatively, or in addition, it is preferred that the maximum temperature in the melting tank is maintained between the 2.88 temperature (1225° C.) and the 2.40 temperature (1350° C.). Within those ranges, the maximum temperature required in the refining tank is largely governed by the desired quality of the glass being produced, and the maximum temperature required in the melting tank is governed both by glass quality and by the presence or absence of melting accelerators such as sodium sulphate which may be included in the batch. Thus for example when melting glass for the production of float glass, it would be desirable to work towards the upper ends of the specified temperature ranges, but for the manufacture of for example bottle glass it would be sufficient to work at the lower ends of those temperature ranges, especially if melting accelerators were to be included in the batch material. By way of comparison, it may be noted that the maximum temperature in a conventional furnace in which glass for the production of float glass is melted and refined in a single tank is, for a particular batch composition, between the 1.85 temperature (1525° C.) and the 1.75 temperature (1550° C.). The present invention can be used for the production of float glass of the same quality from the same batch composition while working within the temperatures ranges referred to above. Accordingly, the maximum temperature in the refining zone can be lower, and that in the melting zone can be quite considerably lower, than when using a conventional process, and this reduced requirement for high temperatures leads to further economy in the use of fuel.

In preferred embodiments of the invention, substantially the whole surface of the melt in the melting tank is covered by unmelted and partially melted batch material. This ensures concentration of heat onto the batch material to be melted, and substantially avoids the presence of clear surface areas of the melt in the melting tank. If such areas were present, there would be a direct path for radiation from the tank superstructure to the refractory material forming the sole of the tank and this could cause overheating of that material. Such overheating would lead to increased heat loss through the melting tank sole, and would also shorten the useful working life of the refractory sole material. This phenomenon will be adverted to later in this specification when discussing the depth of the refining tank.

In preferred embodiments of the present invention, the melt feeding the refining tank is taken from the bottom of the melting tank. This has the advantage of greatly reducing any possibility that unmelted grains of batch material will be entrained in the current feeding the refining tank.

Preferably, glass enters the refining tank in the upper third of the depth of the melt in that tank. The adoption of this feature in combination with feeding the melt from the bottom of the melting tank gives rise to a temperature profile in the passage between the two tanks which is particularly favourable for allowing flow of glass from the melting tank into the refining tank while disallowing flow in the reverse direction.

In preferred embodiments of this invention, the melt in the melting tank is maintained at a depth within the range 450 mm to 1000 mm. This represents a departure from what is presently commercially practised, in that conventional melting tanks are rather deeper, in the range 1200 mm to 1500 mm. The adoption of this preferred feature of the invention affords certain advantages over the present practice. It has been found that the adoption of a depth of less than 450 mm is unfavourable for ensuring that the content of the tank is sufficiently massive to have a thermal capacity which promotes melting of new batch material fed to the tank. The selection of a depth greater than 1000 mm for the melting in the melting tank allows too great a convective circulation of the melt and too high a heat capacity for the melt, so contributing to an increase in heat loss from the tank and consequently to reduced fuel efficiency. The best compromise between, on the one hand, the promotion of circulation in the melt and the promotion of melting and, on the other hand, the reduction of heat loss, is achieved when the melt in the melting tank has a depth within the range 550 mm to 900 mm.

It is particularly preferred that the melt in the refining tank is maintained at a depth within the range 700 mm to 1100 mm. As with the melt in the melting tank, so with the melt in the refining tank, the optimum depth represents a compromise. A depth within the range of 700 mm to 1100 mm promotes convective circulation of the melt in the refining tank which in turn makes the refining process more efficient. Also reference has been made, in relation to the melting tank, to direct radiant heating of the sole of the tank. A depth within the range of 700 mm to 1100 mm allows sufficient depth of melt to ensure that heat radiation from heating means in the superstructure is absorbed in the melt so that the sole of the refining tank is not overheated. Such overheating would lead to unnecessary heat loss through the sole and would also shorten the useful life of the refractory sole material. The maximum depth is limited in order to limit heat loss through the side walls of the compartment. In general, it has been found that the best compromise is achieved when the melt in the refining tank is maintained at a depth within the range 800 mm to 950 mm.

For the best results, no matter what the actual depths of the melts in the melting and refining tanks, the melt in the refining tank is maintained at a greater depth than it is in the melting tank, as is preferred, and it is in addition preferred that the melt in the refining tank is maintained at a depth at least 100 mm greater than it is in the melting tank.

It is particularly preferred that the refining tank is of greater width than the melting tank. As a result of the adoption of this feature, currents of molten material entering the refining tank will slow down. As a result of this, bubbles in the melt are less entrained in those currents, and can accordingly rise to the surface more easily, so contributing to rapid and efficient refining of the melt, and thus in turn to fuel efficiency. The adoption of this feature also implies that there will be one or two shoulders between the melting tank and the refining tank where the surface of the melt is relatively stagnant. It has been found that backward surface currents due to naturally occurring convection within the refining tank tend to carry defects such as unmelted grains back into such a stagnant region, so that such defective glass remains in the refining tank for an increased period of time during which the defect may possibly be cured. Another defect which may be referred to here is the formation of a portion of the melt which is over-rich in silica. Such a melt portion will tend to float and is usually very difficult to homogenize with the remainder of the melt. This too will be carried back into such a stagnant region and can then more easily be homogenized with the rest of the melt. It has been found preferable for the width of the refining tank to be at least 50% greater than the width of the melting tank.

Advantageously, the sill has substantially the same width as the refining tank. The adoption of this feature causes a slowing down of the currents of the molten material as it rises over and travels across the sill after leaving the melting tank. As a result of this, bubbles in the melt may rise to the surface as the melt flows across the sill. Furthermore, the backward surface current in the refining tank referred to above can carry defective glass back upstream of the sill, so that it is no longer within the refining tank proper. These results contribute to an improved refining of the glass.

Advantageously, the width of the refining tank is at least 50% greater than its length. It has been found that the glass of highest quality tends to concentrate at the centre of such a tank whence it may be drawn off leaving lower quality glass towards the sides of the tank. The glass towards the sides of the tank can then remain in the tank for longer so that it may achieve the desired quality. Also, the adoption of this preferred feature allows a refining tank of greater plan area for a given length than would otherwise be possible.

The plan area of the refining tank, which defines the surface area of the melt in the refining tank, has an important effect on the refining process, and must clearly be sufficient to allow heating of the melt to be refined and for bubbles in the melt to rise and be dissipated. The ease and rapidity of heating and bubble removal is promoted when the refining tank is of greater plan area than the melting tank, as is preferred. Optimally, the plan area of the refining tank is at least 15% greater than the plan area of the melting tank.

In some preferred embodiments of this invention, the melt in at least one said tank is in part heated electrically. By the adoption of this feature, the melt can be heated internally and locally, so that convection currents can be induced in the melt or otherwise controlled.

A method according to the present invention is most efficiently performed with the melting tank at a lower temperature than is usual in a conventional glass-melting furnace, and with substantially the whole of the surface of the melt in the melting tank covered by batch material and foam resulting from melting reactions. Under those circumstances, the already molten material in the melting tank is screened from burners above the tank, so that the melt in the melting tank may be kept at as low a temperature as is desired. As a result of this, in the depths of the tank the glass may have a relatively high viscosity, and it may even have a tendency to devitrify or to freeze. Such devitrification or freezing may be avoided by increasing the heat output of the burners, or by electrically heating the melt to boost its circulation. Increasing the heat output of the burners is less efficient because this would also heat for example the whole superstructure of the tank: electrical heating on the other hand can be applied to the melt directly and locally where it is most needed without raising the temperature of the entire tank and superstructure.

Advantageously, the melt is heated electrically at the charging end of said melting tank. It is at that region that the viscosity of the melt is likely to be highest, and it is there that in the absence of electrical heating the risk of devitrification of the melt is greatest.

It is also desirable thermally to condition the melt in the melting tank at one or more zones away from the charging end of said melting tank, and it is accordingly preferred that the melt is heated electrically in a region of said melting tank which is located spaced from the charging end tank wall by at least one third of the melting tank length.

It is particularly preferred that the melt is heated electrically within the lower half of the depth of at least one said tank.

Electrically heating the melt in the refining tank also gives advantages, and it is especially preferred that the melt is heated electrically within the central third of the length of the refining tank. Heating of the melt in that central third region causes a reinforcement of the natural upwelling of the melt which takes place there, analogous to the upwelling in the spring zone of a conventional glass melting furnace. The upwelling in the central third of the length of the refining tank tends to provide a barrier against melt flowing directly from the entrance of the refining tank to its exit, and this barrier is sharpened, and its position is stabilised by electrical heating, so contributing to a flow pattern within the refining tank which is favourable for efficient refining of the glass.

The present invention may be, and preferably is performed using a furnace which forms the subject of a copending U.S. patent application No. 06/675,895, filed Nov. 28th, 1984, in which there is described and claimed apparatus for manufacturing glass comprising a continuous glassmelting tank furnace having a melting zone for receiving and melting raw batch mateial, and a refining zone for delivering molten refined glass, characterised in that such furnace comprises communicating melting and refining compartments each comprising a tank and a superstructure, the melting and refining compartments being disposed to either side of a shadow arch which is constituted by a cover, the shadow arch cover extending from a shadow wall at the downstream end of the melting compartment to an upstream end wall of the refining compartment superstructure, there being a passage located beneath the shadow wall giving communication between the tanks, and there being a sill positioned between the shadow wall and a refining tank, the top of such sill being at a level at least as high as the top of the passage beneath the shadow wall.

BRIEF DESCRIPTION OF THE DRAWINGS

The present invention will now be described in greater detail, and by way of example only, with reference to the accompanying diagrammatic drawings which reproduce those accompanying the said copending U.S. patent application No. 06/675,895, and in which.

DESCRIPTION OF THE PREFERRED EMBODIMENTS

Figure 1:
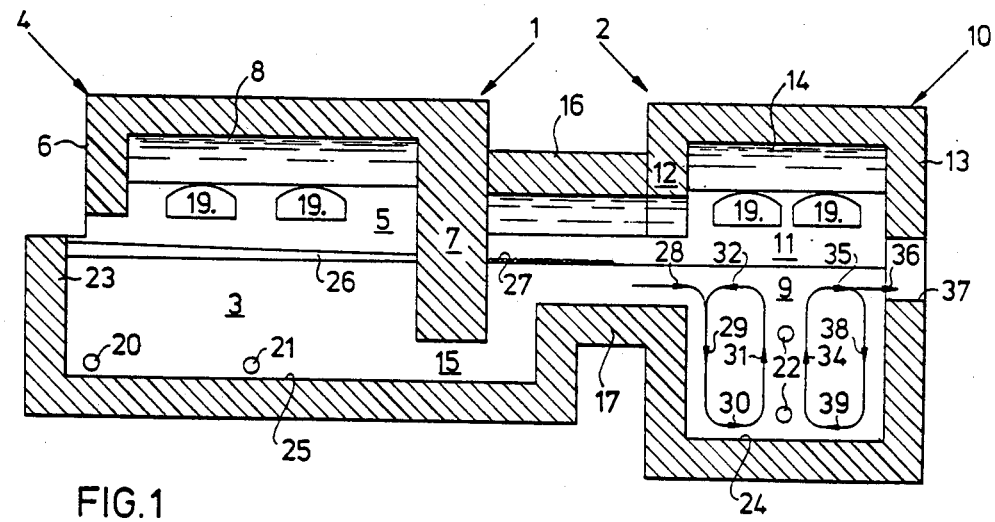
FIGS. 1 and 2 are respectively cross sections in side and plan view of a first embodiment of apparatus suitable for performing the invention.

In the drawings, a continuous glass-melting tank furnace comprises a melting compartment 1 and a refining compartment 2. The melting compartment has a melting tank 3, and a superstructure 4 comprising breast walls 5, a charging end gable wall 6, a downstream end wall 7 and a crown 8. The refining compartment likewise has a refining tank 9, and a superstructure 10 comprising breast walls 11, an upstream end wall 12, a downstream end wall 13 and a crown 14. The melting and refining compartments communicate by means of a passage 15 located beneath the downstream end wall 7 of the melting compartment 1 which wall is constituted as a shadow wall. The gap between the downstream end wall 7 of the melting compartment 1 and the upstream end wall 12 of the refining compartment superstructure 10 is substantially closed by an arch cover 16 which forms a shadow arch between those walls. A sill 17 is positioned downstream of the shadow wall 7, and the top of the sill 17 is at a level which is at least as high as the base of that shadow wall.

In the apparatus illustrated, part of the sill is located beneath the shadow arch 16, and the downstream end of the sill 17 is in vertical register with the inner face of the upstream end wall 12 of the refining tank superstructure.

Figure 2:
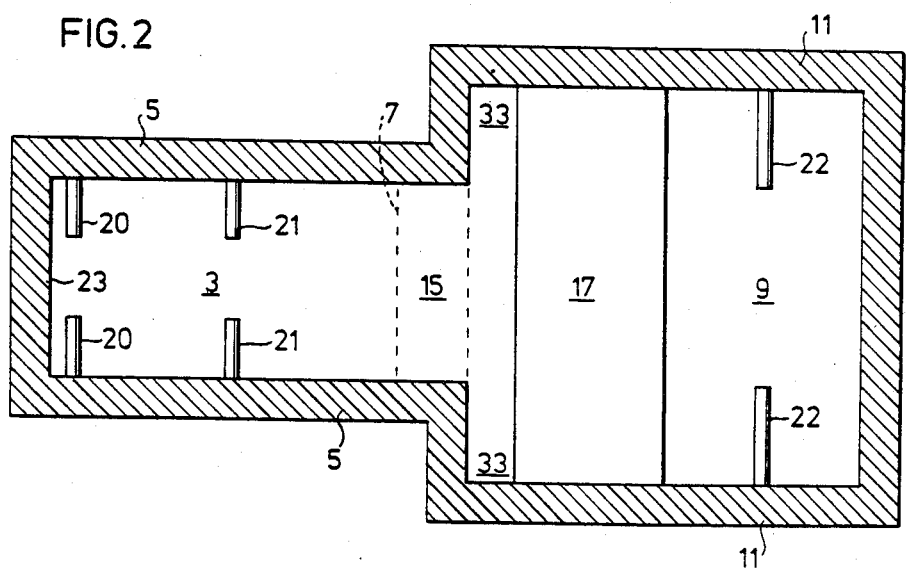

In the apparatus illustrated in FIGS. 1 and 2, the bottom of the arch cover 16 is substantially level with the bottom of the upstream end wall 12 of the refining compartment superstructure. In the apparatus illustrated in FIGS. 3 and 4, the upstream end wall 12 of the refining compartment superstructure 10 extends below the level of the arch cover 16 to form a shadow screen 18. Such a shadow screen 18 can conveniently project down close to the level of the surface of the melt to give better shading of the sill 17. If desired, such a shadow screen may be of hollow construction and incorporate cooling means in order to prolong its useful life. The shadow wall 7 at the upstream end of the arch may likewise be hollow and cooled.

The melting and refining compartments 1,2 are provided with heating means represented as ports of regenerator burners 19. In the apparatus illustrated in FIGS. 1 and 2, each of the melting and refining compartments is provided with two such burners 19. In the apparatus illustrated in FIGS. 3 and 4, the melting compartment 1 is provided with two such burners, while there are three burners 19 in the refining compartment 2 so that there is a greater heating capacity in the refining compartment.

In the apparatus illustrated, auxiliary heating is provided by electrodes 20, 21 and 22. Electrodes 20 are located at the upstream end of the melting tank 3, in the lower half of its depth and close to a charging end tank wall 23. Electrodes 21 are also located in the lower half of the depth of the melting tank 3, but spaced from the charging end tank wall 23 by at least one third of the length of the melting tank 3. The electrodes 22 are located in the central third of the length of the refining tank 9. The effectiveness of the electrodes 22 in the refining tank 9 is made greater when each side wall of the tank carries a plurality of such electrodes arranged in vertical register as shown.

The production capacity of a glass melting furnace, measured in tonnes of glass produced per day, will obviously depend on the volumes of the melting and refining tanks. However, over a very wide production capacity range, the optimum depths of those tanks will not vary a great deal. Indeed, the optimum depths of those tanks is more affected by the composition of the glass being manufactured. Production capacity can be varied by altering the plan areas of those tanks. For example in a pilot furnace producing about 6 T/d, the optimum depth of the melting tank was found to be about 600 mm for the manufacture of soda-lime glass, and this depth is in fact suitable for any production rate within the range 4 T/d to 700 T/d. In production furnaces having capacities in that range, the optimum depth of the melting tank lies in the range 550 mm to 900 mm. If the melting tank is constructed with a depth towards the lower end of that range, it is generally desirable to use auxiliary electrical heating means such as the electrodes 20 and 21, while with depths towards the upper end of that range, the absence of electrical heating may be preferred.

In both the illustrated apparatus, the sole 24 of the refining tank 9 is at a lower level than the sole 25 of the melting tank 3. In a furnace having a refining tank deeper than the melting tank, the effectiveness of the sill 17 in preventing return currents is enhanced. The optimum depth for a refining tank of a furnace having a production capacity in the range 4 to 700 T/d lies in the range 800 mm to 950 mm.

The optimum height of the passage 15 beneath the shadow wall 7, and the height of the top of the sill 17 above the sole 25 of the melting tank 3 are governed by the depth of that tank. In general, it is preferable for the passage 15 to have a height equal to about one third of the depth of the melting tank, while the sill 17 has a height approximately equal to two thirds of that depth. The downstream distance between the shadow wall 7 and the sill 17 is preferably somewhat greater than one third of the depth of the melting tank. The passage 15 beneath the shadow wall 7 may extend across the full width of the melting tank 3 as shown in FIGS. 1 and 2, or it may be confined to a central portion of that width as shown in FIGS. 3 and 4.

In the apparatus illustrated in FIGS. 1 and 2, the refining tank 9 has a greater width than the melting tank 3, and the refining tank is wider than it is long. In a specific practical apparatus, the melting tank 3 was 6 units wide by 10 units long, and the refining tank was 12 units wide by 6 units long. The refining tank was accordingly of greater plan area than the melting tank.

Figure 3:
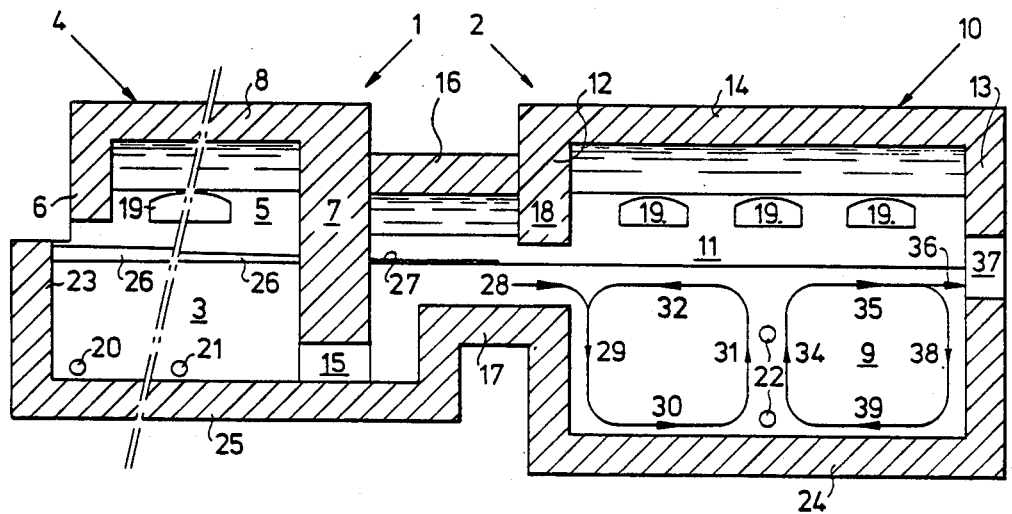
FIGS. 3 and 4 are corresponding views of a second embodiment of apparatus suitable for performing the invention.
Figure 4:
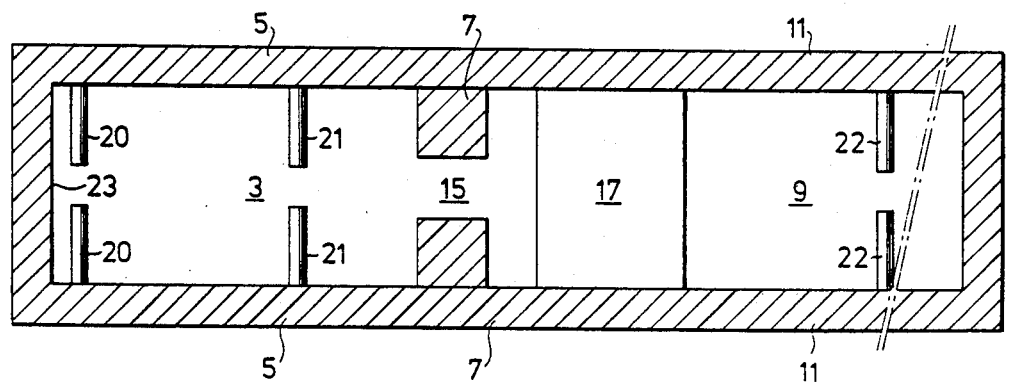

In the apparatus illustrated in FIGS. 3 and 4, the melting and refining tanks have the same width, and in a specific practical apparatus the lengths of those tanks were in the ratio 10 to 11.

In a specific practical example, using the apparatus illustrated in FIGS. 1 and 2 for the manufacture of soda-lime glass, batch material 26 was fed to the melting tank 3 so as to cover the whole of the surface of the melt, and the melt in that tank was held at as low a temperature as was consistent with the avoidance of devitrification and the maintenance of a sufficiently low viscosity. Heating was controlled so that the melt in the passage 15 beneath the shadow wall 7 was at a temperature between the 3.00 temperature and the 2.60 temperature (in the range 1250° C. to 1300° C.). The melt at the centre of the sole 24 of the refining tank 9 was at a temperature between the 2.55 temperature and the 2.36 temperature (in the range 1320° C. to 1370° C.), and the melt close to the exit from the refining tank 9 was at a temperature between the 2.10 temperature and the 2.00 temperature (in the range 1450° C. to 1480° C.). The melt above the sill 17 and beneath the shadow arch 16 was at a temperature between the 2.36 temperature and the 2.20 temperature (in the range 1370° C. to 1420° C.): this portion of the melt was covered in foam 27 resulting from melting and glass forming reactions.

Under those conditions, a flow pattern of melt currents in the refining tank is built up which is similar in form to that shown in FIG. 1. The melt in the current flowing over the sill 17 to enter the refining tank, indicated by arrowhead 28, is cooler than the melt in the upstream end of that tank, and so it forms a sinking current 29 at the upstream end wall of the refining tank, and then flows as a forward return current 30 along the sole 24 of the tank 9 to the centre, where the tank is hottest. As a result, the current 30 develops into a rising current 31 which in turn becomes a backward surface current 32 which flows back towards the entrance to the refining tank to join the sinking current 29. The backward surface current 32 tends to entrain any defects floating in the melt and confines those defects to the upstream end of the refining tank 9. If the refining tank 9 and sill 17 are wider than the melting tank 3, as is the case with the apparatus shown in FIGS. 1 and 2, those defects will be carried into shoulder regions 33 upstream of the sill 17 (shown in FIG. 2) where they may rest, and possibly become incorporated into a homogeneous melt. In the downstream half of the refining tank 9, there is also a central rising current, indicated at 34, and this feeds a forward surface current 35, which in turn feeds an exit current 36 of refined glass flowing to the exit 37 from the refining tank, and a downstream end wall sinking current 38 which flows into a bottom return current 39 and then joins the central rising current 34. Because of this pattern of currents, which arises naturally in the refining tank 9, there is a marked separation of the glass in the upstream and downstream halves of that tank, so that the glass current 28 entering the tank cannot flow directly to the exit 37, and two distinct recirculating flow paths are established. This is extremely favourable for ensuring that none of the melt is prematurely drawn off. The use of the heaters 22 sharpens and stabilises the position of the distinction between these two recirculating flow paths.

Operating in that way, using a furnace which was insulated to the optimum extent, it was found that is was possible to make a saving in the total energy consumed of between 15 and 20% as compared with a conventional tank furnace of the same capacity producing glass of the same composition and quality at the same rate.

What I claim is:

1. A method of manufacturing glass in which raw material is fed as a batch to a continuous glass-melting tank furnace which includes a melting chamber, a separate refining chamber having an upstream end, and means including a rising passageway and a sill at the upstream end of the refining chamber for communicating molten glass between the chambers, comprising: melting the batch in a melting zone disposed in said melting chamber; passing the molten glass to a refinement zone disposed in said refining chamber for refinement therein in an atmosphere isolated from that of said melting chamber, by permitting the molten glass to flow from the melting chamber to the refining chamber via the rising passageway and over the sill at the upstream end of the refining chamber; and heating the glass at the upstream end of the refining chamber to a higher temperature than that of the glass over the sill so that glass leaving the sill plunges in the refining chamber and glass in that chamber is precluded from forming a return current to the melting chamber.

2. A method according to claim 1, wherein the refining chamber comprises a refining tank, and wherein the melt enters the refining tank from a region where the surface of the melt is, due to the prevailing temperature and flow rate, substantially covered by foam.

3. A method according to claim 1, wherein the melting chamber comprises a melting tank, wherein the refining chamber comprises a refining tank, and wherein the maximum temperature of the glass in the refining tank is kept higher than the maximum temperature of the glass in the melting tank.

4. A method according to claim 3, wherein the maximum temperature of the glass in the refining tank is maintained at a value which is at least 100° C. greater than the maximum temperature of the glass in the melting tank.

5. A method according to claim 3, wherein the maximum temperature in the refining tank is maintained between the temperature at which the logarithm to base 10 of the viscosity of the glass in Poises is about 2.18 and the temperature at which the logarithm to base 10 of the viscosity of the glass in Poises is about 1.95.

6. A method according to claim 1, wherein the melting chamber comprises a melting tank, and wherein the maximum temperature in the melting tank is maintained between the temperature at which the logarithm to base 10 of the viscosity of the glass in Poises is about 2.88 and the temperature at which the logarithm to base 10 of the viscosity of the glass in Poises is about 2.40.

7. A method according to claim 1, wherein the melting chamber comprises a melting tank, and wherein substantially the whole surface of the melt in the melting tank is covered by unmelted and partially melted batch material.

8. A method according to claim 1, wherein the melting chamber comprises a melting tank, wherein the refining chamber comprises a refining tank, and wherein the melt feeding the refining tank is taken from the bottom of the melting tank.

9. A method according to claim 1, wherein the refining chamber comprises a refining tank, and wherein glass enters the refining tank in the upper third of the depth of the melt in that tank.

10. A method according to claim 1, wherein the melting chamber comprises a melting tank, and wherein the melt in the melting tank is maintained at a depth within the range 450 mm to 1000 mm.

11. A method according to claim 1, wherein the refining chamber comprises a refining tank, and wherein the melt in the refining tank is maintained at a depth within the range 700 mm to 1100 mm.

12. A method according to claim 1, wherein the melting chamber comprises a melting tank, wherein the refining chamber comprises a refining tank, and wherein the melt in the refining tank is maintained at a greater depth than it is in the melting tank.

13. A method according to claim 12, wherein the melt in the refining tank is maintained at a depth at least 100 mm greater than it is in the melting tank.

14. A method according to claim 1, wherein the melting chamber comprises a melting tank, wherein the refining chamber comprises a refining tank, and wherein the refining tank is of greater width than the melting tank.

15. A method according to claim 14, wherein the width of the refining tank is at least 50% greater than the width of the melting tank.

16. A method according to claim 14, wherein the sill has substantially the same width as the refining tank.

17. A method according to claim 14, wherein the width of the refining tank is at least 50% greater than its length.

18. A method according to claim 1, wherein the melting chamber comprises a melting tank, wherein the refining chamber comprises a refining tank, and wherein the refining tank is of greater plan area than the melting tank.

19. A method according to claim 18, wherein the plan area of the refining tank is at least 15% greater than the plan area of the melting tank.

20. A method according to claim 1, wherein the melting chamber comprises a melting tank, wherein the refining chamber comprises a refining tank, and wherein the melt in at least one said tank is in part heated electrically.

21. A method according to claim 20, wherein the melt is heated electrically at the batch feed end of said melting tank.

22. A method according to claim 20, wherein the melting tank has a charging end tank wall, and wherein the melt is heated electrically in a region of said melting tank which is located spaced from the charging end tank wall by at least one third of the melting tank length.

23. A method according to claim 20 wherein the melt is heated electrically within the lower half of the depth of at least one said tank.

24. A method according to claim 20, wherein the melt is heated electrically within the central third of the length of the refining tank.

25. A method according to claim 5, wherein the maximum temperature in the melting tank is maintained between the temperature at which the logarithm to base 10 of the viscosity of the glass in Poises is about 2.88 and the temperature at which the logarithm to base 10 of the viscosity of the glass in Poises is about 2.40.

* * * * *